United States Patent

Bicciato

[19]

[11] Patent Number: 6,160,955
[45] Date of Patent: *Dec. 12, 2000

[54] CONTROL CIRCUITS OF AN APPARATUS FOR PHYSICAL EXERCISES

[75] Inventor: Federico Bicciato, Padua, Italy

[73] Assignee: GE Power Controls Italia S.p.A., Procund Elettronica Division, Milan, Italy

[ * ] Notice: This patent issued on a continued prosecution application filed under 37 CFR 1.53(d), and is subject to the twenty year patent term provisions of 35 U.S.C. 154(a)(2).

[21] Appl. No.: 08/802,341

[22] Filed: Feb. 11, 1997

[30] Foreign Application Priority Data

Oct. 25, 1996 [IT] Italy ................... PN9600060

[51] Int. Cl.[7] ........................................ H02P 5/11
[52] U.S. Cl. .................. 388/811; 388/829; 388/903; 318/434; 318/461
[58] Field of Search .................... 388/809–815, 388/829, 903, 904, 916, 920, 811, 819; 318/434, 446, 461

[56] References Cited

U.S. PATENT DOCUMENTS

| 4,017,775 | 4/1977 | Artrip . | |
|---|---|---|---|
| 4,581,900 | 4/1986 | Lowe . | |
| 4,749,181 | 6/1988 | Pittaway . | |
| 4,888,813 | 12/1989 | Penn et al. | 388/838 |
| 5,650,709 | 7/1997 | Rotunda et al. | 318/802 |
| 5,682,459 | 10/1997 | Wikerson | 388/811 |

FOREIGN PATENT DOCUMENTS

2674701  10/1992  France .

*Primary Examiner*—David Martin
*Attorney, Agent, or Firm*—Wenderoth, Lind & Ponack, L.L.P.

[57] ABSTRACT

Apparatus providing a control and protection arrangement for walking/running exercise machines which is effective to provide protection against malfunction conditions which may be experienced by the exercise machines, to thereby protect users of the exercise machine against injuries. The present invention provides an efficient response time to motor speed variations to provide greater user safety.

12 Claims, 6 Drawing Sheets

CONTROL CIRCUITS OF AN APPARATUS FOR PHYSICAL EXERCISES

BACKGROUND OF THE INVENTION

1. Field of the Invention

The present invention relates to an exercise apparatus as normally used to perform physical exercise based on walking or running, as well as to measure the physical characteristics of athletes or people undergoing clinical tests under specified and controlled fatigue conditions.

Such machines are generally known in the art under the name of running/walking machines, or treadmills.

In particular, the present invention relates to the control and protection arrangements that are provided against possible failures and improper operation of the machine that might cause the user to suffer injuries.

2. Description of Related Art

Physical exercise machines of the above described kind are known in which a horizontally sliding belt driven by a motor determines the rate or speed of walking or running which the user desires to maintain in order to stay on the belt.

Such machines comprise arrangements to control and regulate the speed of the belt in accordance with appropriate commands that are entered and stored in a computer control system. In such control arrangements, the feedback signal that represents the actual speed of the belt is generated by an appropriate sensor, or encoder, which may, for instance, be constituted by an optical sensor or a tachometer.

The speed control system of the motor compares the command signals with the speed feedback signal and the detected deviation is used to correct and adjust the voltage applied to the input terminals of the motor accordingly.

If, for any reason, the feedback signal is lost, the automatic speed control system, if protective precautions are lacking, will act as if the belt has stopped and, therefore, a speed-up demand will be generated and transmitted to the motor, so that the speed will rapidly reach its highest possible value.

As a result, a sudden and spontaneous increase in the motor and, hence, belt speed in these machines would most probably find the user unprepared and throw the same user backward with a powerful force, since the belt is moving toward the rear with respect to the position of the user.

In view of eliminating such a possible cause of accident, it is known in the art to provide safety devices and design arrangements in the central control unit (CPU) so as to avoid incurring such hazardous situations as described. Such safety arrangements include the provision of so-called "watchdog" circuits, i.e. circuits that are adapted to prevent such accidents from occurring and to stop the operation of the machine also in the case of an improper operation or a failure of said safety circuits. However, all such prior art solutions have a number of functional and safety drawbacks that will be shortly described below:

A) If the major causes that may give rise to a runaway speed condition of the belt-driving motor are examined, they will be found to be determined by any of the following conditions:

a short-circuit condition of the power switch;
a demand for abnormal input to the motor control circuits, particularly a permanent demand for maximum speed; and
an interruption of the speed feedback signal sent by the speed sensor, usually an encoder.

While a malfunction condition concerning the encoder may well be recognized from the detection based on the speed error (although it should be noticed that a runaway speed condition of the motor may only occur when the CPU closes the speed loop), the recognition of the other two types of malfunction is not effective when done with this type of method.

As a matter of fact, since the prior art method is based on the reading of the number of pulses of the encoder (on the basis of a unit of time) or on a measurement of the time between consecutive pulses, the prior art solution is linked to the mechanical time constant of the system.

If, for instance, the power switch enters a short-circuit condition, it becomes necessary to wait for the motor to increase its speed before this increase in speed can be read through the encoder and, as a result, an error-proof and fail-safe switching off can occur. This may require up to several hundred milliseconds in systems in which the motor response is a quick one and speed jerks are dangerous for the safety of the user.

It should be noticed that the minimum actual time of detection of the short-circuit condition in the power switch is linked to the electric time constant.

B) Prior art solutions are not provided with any means adapted to detect a malfunction condition with the motor at a standstill. This gives rise to a real hazardous condition in that, if the machine is switched on and the motor power-supply switch is in a failure state, the walking/running surface starts moving abruptly under the highest possible acceleration, with resulting possible risks of accident and injury to the user.

SUMMARY OF THE INVENTION

It therefore would be desirable, and it is actually a main purpose of the present invention, to provide an exercise apparatus or treadmill which is provided with such circuits and devices so as to eliminate all of the afore-mentioned hazardous situations and drawbacks.

It is a further purpose of the present invention to improve the so-called "robustness" of the apparatus (i.e. to make it drastically less vulnerable to possible malfunction conditions that may affect any of the circuits and devices used).

It is another purpose of the present invention to provide for the operation of the circuits and devices to safely occur in a fully automatic manner.

All such aims shall furthermore be reached through the use of such techniques and component parts as readily available on the market.

The present invention describes a type of apparatus having the characteristics as substantially recited with particular reference to the appended claims.

These and other objects of the invention will be clear from the description of the invention given herein and more particularly with reference to the following detailed description of the invention and with reference to the accompanying drawings.

DETAILED DESCRIPTION OF THE INVENTION

Figure 1:
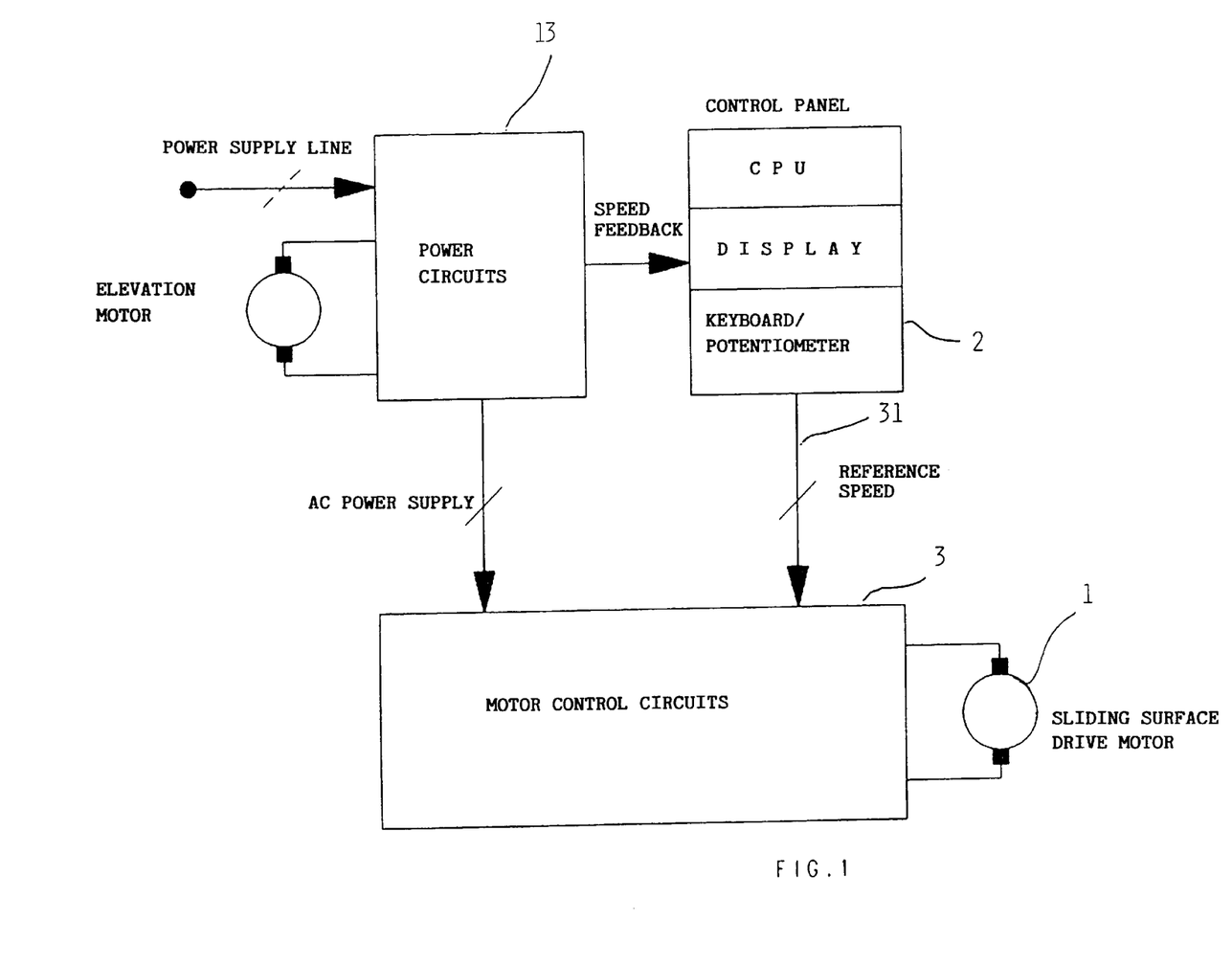
FIG. 1 is a block diagram showing in principle the control and command members of the apparatus according to the present invention.

With reference to FIG. 1, the AC power supply reaches the "power circuits" assembly 13 which is provided with a fuse connected in series with the line. Such a power assembly 13 takes on the control of the elevation motor (i.e. a part which is not relevant to the purpose of the present description).

The command devices 2 may be of a more or less sophisticated kind, depending on the actual treadmill model. The most simple configuration includes a simple display panel providing information on the actual speed of the walking/running surface, and a potentiometer or a simple keyboard.

In more sophisticated configurations, which generally make use of a CPU (Central Processing Unit) comprising a microcontroller 11, a much greater amount of information can be provided through the display panel and a number of speed profiles can be entered and pre-set through the keyboard.

The output of the command devices 2, regardless of their configuration, is a speed reference signal which is sent to the "motor control circuits" block 3.

In the case of control panels of a simple kind, such a signal directly represents the reference speed that has been pre-set through the potentiometer or the keyboard. In control panels of a more complicated or sophisticated kind, the signal is generated by a speed control algorithm performed by the CPU.

The main purpose of the circuits 3 is to keep the speed of the belt as close as possible to the reference speed, wherein it should be noticed that no direct speed feedback is used by the circuits 3.

In order to reach such an aim, the microcontroller 11 regulates the voltage through the motor terminals, reads the motor current, and compensates for the voltage drops caused on the rotor resistance of the motor by load variations due to the user's steps treading thereupon. In other words, this is a compensation of the voltage given by the product of the motor current by the rotor resistance, known also as IR compensation.

Figure 2:
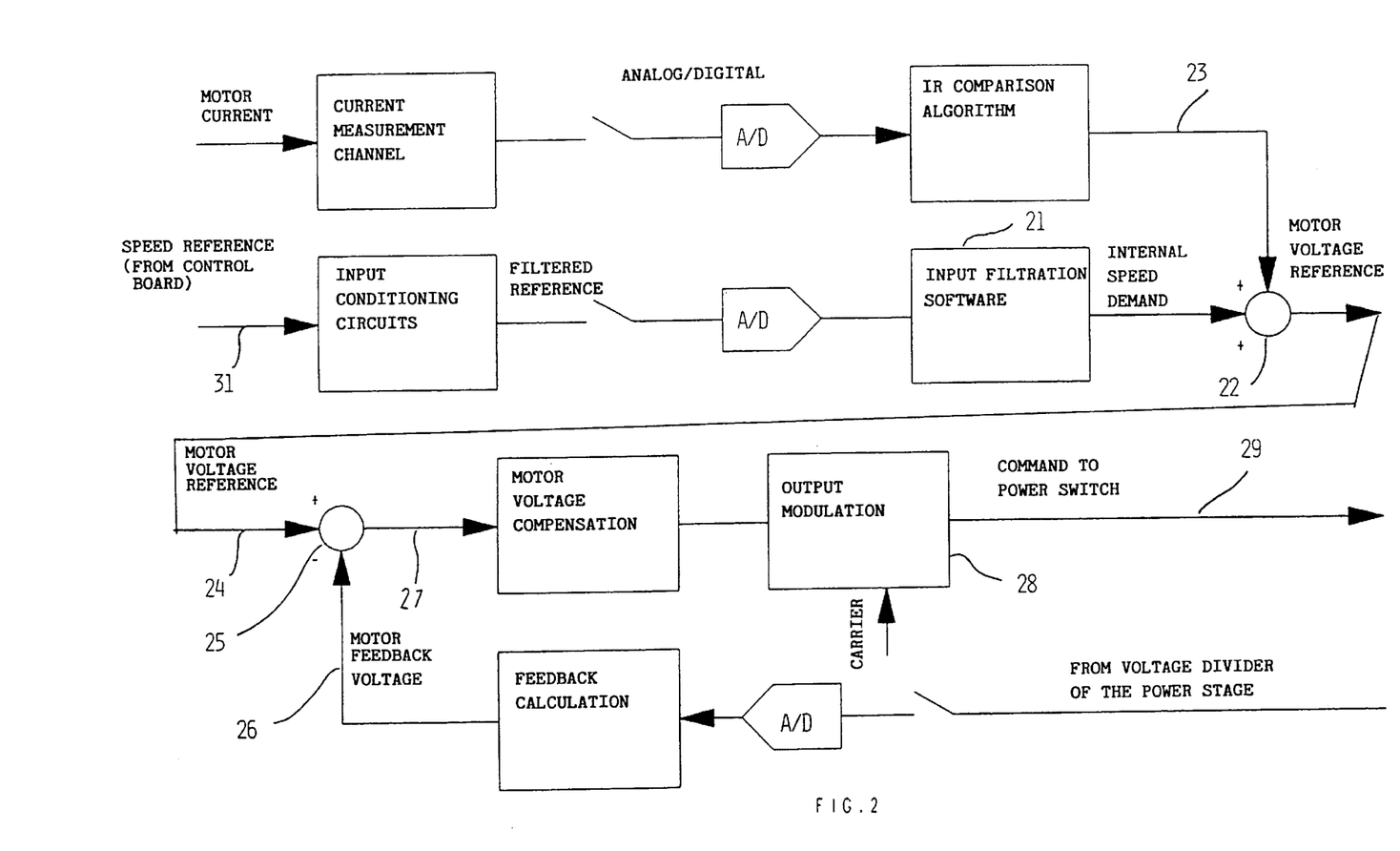
FIG. 2 is a flow-chart showing the operational modes of a part of the control circuits of an apparatus according to the present invention.

With particular reference to FIG. 2, the diagram showing the manners in which the control circuits 3 regulate the speed, such that this is worked out by both hardware and software processing, is illustrated.

The output signal from the input filtration software block 21 is added at 22 to the contribution 23 due to the IR compensation, and this addition constitutes then the reference 24 to the motor voltage control loop.

Such an internal reference is compared at 25 with the feedback 26 of the motor voltage to obtain the voltage error 27 which is used as an input for the motor voltage compensation algorithm.

The so processed signal (algorithm output) is pulsewidth modulated by the block 28 to form the command 29 to the power switch.

Figure 3:
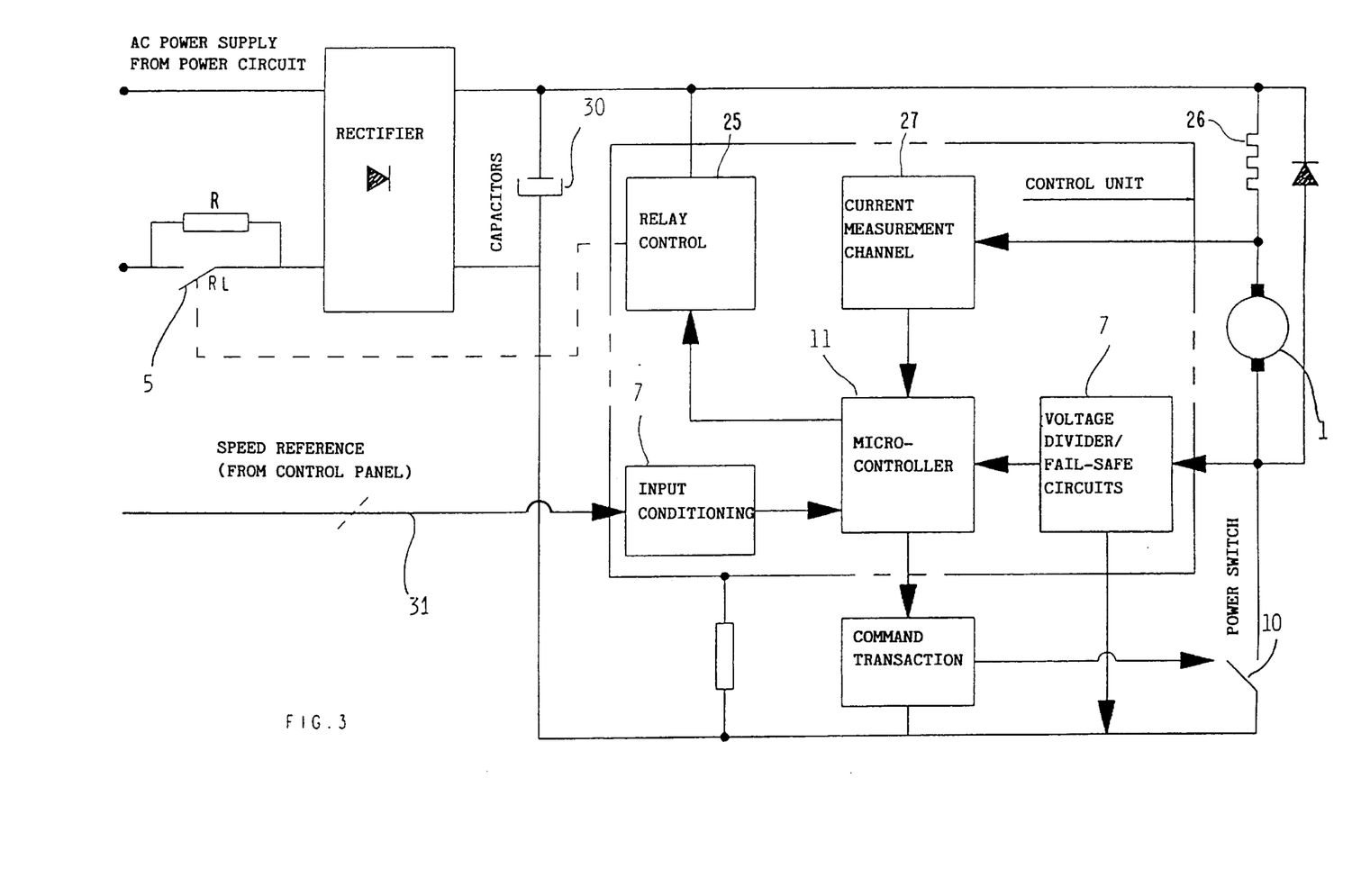
FIG. 3 is a block diagram showing the circuits and devices that are included in the block identified as "control circuits" in FIG. 1.

FIG. 3 does not exhaustively illustrate all of the circuits that are actually used, since many other inputs to the microcontroller are actually provided in order to obtain full operativeness and functionality of the control circuits.

Let us now refer again to the prior art that uses solely a speed sensor, preferably an encoder, to detect the speed of the walking/running surface. According to such prior art, the types of command devices 2 that are provided with a CPU can in general use the information coming from the encoder for two purposes.

First, such information can be used to close an external speed loop to compensate for the variations in the parameters of both the motor and the mechanical system in general, mainly due to aging. Two control loops coexist in such a case, i.e. an external loop, which is slower but uses a really direct speed feedback, and an internal loop, in the control circuits, which is quicker and uses an indirect speed feedback.

The second purpose of the CPU is to use the calculated speed value to cause the apparatus to be turned into a switch-off mode whenever the amplitude of the speed error exceeds a given fixed threshold for a pre-determined period of time. In this case, the operational safety of the apparatus is essentially based on such a mode of operation.

The present invention surpasses the above described mode of operation, and overcomes the drawbacks connected therewith, by:

a) providing first control circuits 7 adapted to perform the following monitoring duties:

detection of the voltage and the current of the walking/running surface drive motor;

detection of irregular or faulty conditions possibly arising in said control circuits 3; and detection of irregular or faulty conditions possibly arising in the connections between the control circuits 3 and the command devices 2; and b) eliminating the motor speed sensor (frequently referred to as the "encoder").

The reasons why the overall technical solution described above is effective in eliminating the afore-mentioned drawbacks are as follows:

A) The control circuits 3 are provided with more effective and "error-proof" means. In fact, if the major causes that may be found at the base of the problem leading to a runaway speed condition of the walking/running surface drive motor are looked at more closely, these turn out to be the following ones:

a short-circuit condition of the power switch;

a demand for abnormal input to the motor control circuits, particularly a permanent demand for maximum speed; and an interruption of the speed feedback signal coming from the encoder.

While a malfunction or faulty condition concerning the encoder may well be recognized from the detection based on the speed error (although it should be noticed that a runaway speed condition of the motor 1 may only occur when the CPU closes the speed loop), the recognition of the other two types of malfunction is not effective when done with this type of method.

As a matter of fact, since the prior art method is based on the reading of the number of pulses of the encoder (on the basis of a unit of time) or on a measurement of the time between consecutive pulses, the prior art method is linked to the mechanical time constant of the system.

If, for instance the power switch 10 enters a short-circuit condition, it becomes necessary to wait for the motor to increase its speed before this increase in speed can be read through the encoder and, as a result, an error-proof and fail-safe switching off can occur. This may require up to several hundred milliseconds in systems in which the motor response is a quick one and speed jerks are relevant for the safety of the user.

B) Means adapted to detect a malfunction condition with the motor at a standstill are provided in the control circuit 3, whereas none of the prior art solutions is provided with such means.

Figure 4:
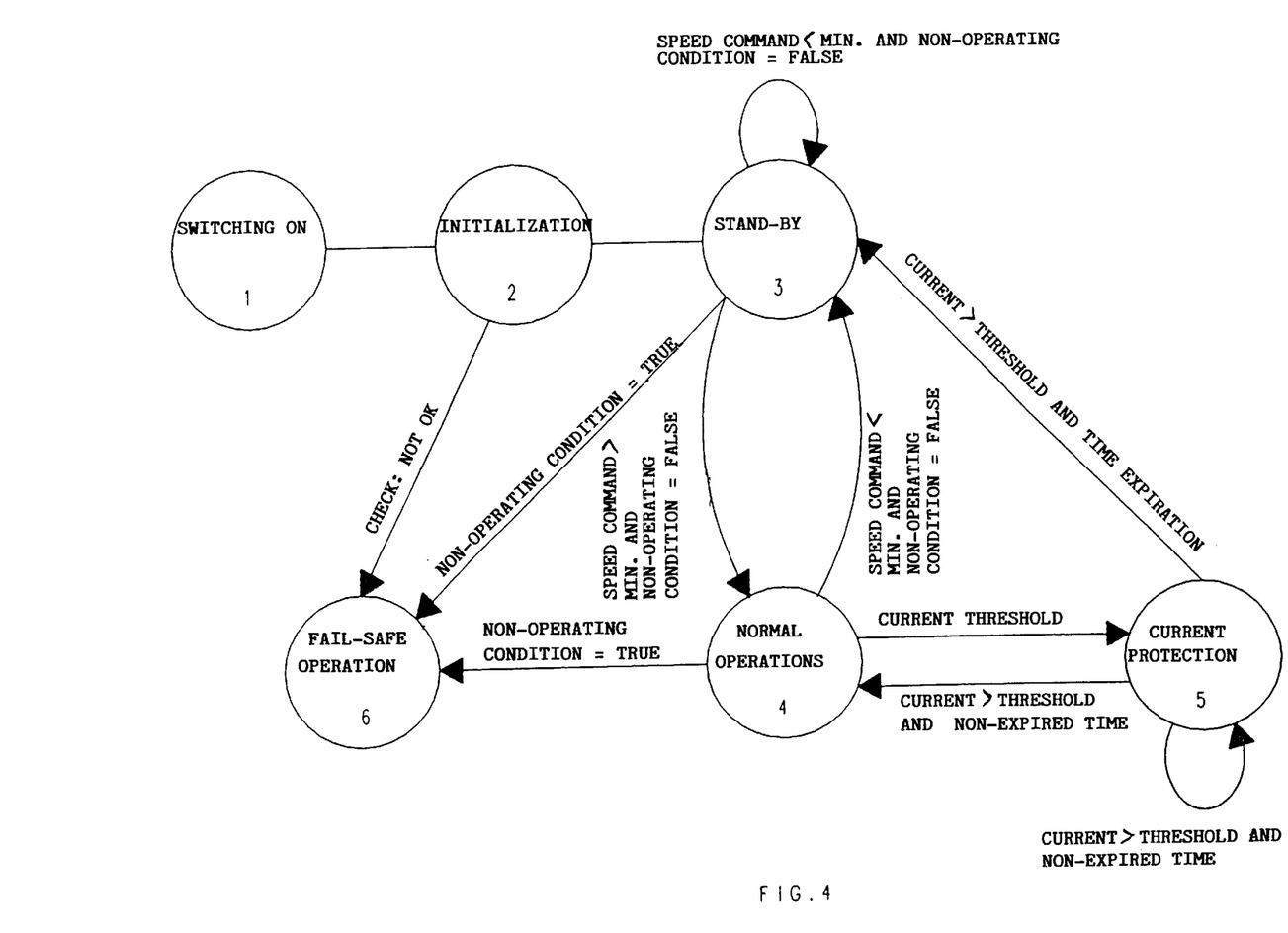
FIG. 4 is a flow diagram showing in principle the manners in which an apparatus according to the present invention changes from one state into another state.

In order to better understand the scope of the proposed "error-free" or "fail-safe" feature, a closer look should be given at FIG. 4, which illustrates a flow diagram showing the operational states of the control circuits 3. Their operation, with particular reference to what has been illustrated under A) and B) above, is described below:

1) Upon switching on, the capacitor bank 30 in FIG. 3 is charged through a high-impedance path (parallel to the switching-off switch 5, relay R1) which is initially open. In this way, the charging current of the capacitor bank does not flow through the switching-off switch 5, thereby increasing the reliability of the system.

2) During the initialization phase, the control circuits 3 check the power switch 10 for the presence of possible short-circuit conditions.

In order to be able to recognize such an irregular or faulty condition during the initialization phase, an appropriate voltage divider is provided to convert the state of the power switch (off/on) into a logic level (low/high) at the corresponding input of the microcontroller. If the outcome of the preceding checks turns out to be unsatisfactory, the microcontroller goes into the fail-safe, or "error-free", state of operation (see point 6 in FIG. 4).

3) If the initialization checks confirm a correct operational condition, the microcontroller goes into the stand-by state, in which the switching-off switch 5 stays off, i.e. open, until the speed reference signal 31 of the command circuit 2 happens to exceed the minimum speed threshold starting from a value below the same threshold.

This practically means that, for the control circuits 3 to be able to start, the input shall first be brought down to values below the minimum speed threshold and then brought up to values above the threshold. The microcontroller will therefore not be able to start from any other condition than a minimum-speed one.

In the stand-by phase, if a short-circuit condition is detected in the power switch 10, the microcontroller will switch over to the error-free or fail-safe state of operation (see point 6 in FIG. 4).

4) When the input reference speed 31 is increased beyond the minimum-speed threshold, the switching-off switch 5 is closed by the microcontroller, the PWM output driving the power switch 10 (see FIGS. 2 and 3) is enabled and the power is sent to the motor 1 of the walking/running surface.

This state represents the NORMAL OPERATION state, in which both the motor voltage regulation and the IR compensation are activated.

In a preferred manner, the motor voltage regulation acts by controlling the voltage at the terminals of the motor with an accuracy of approx. ±0.5/100 of the fullscale value.

In the presence of torque variations due to the user running or walking, the momentary speed variations should be restricted within ±3% of the full-scale value.

The microcontroller uses a number of criteria to identify the malfunction or fail conditions listed below:

short-circuit condition in the power switch (100-percent modulation);

false contact at the motor terminals; and input speed reference signal permanently at the maximum value.

The short-circuit condition of the power switch is detected using two different methods, the first one of which is based on the voltage error calculated by the motor voltage regulation loop (FIG. 2).

When the power switch enters a short-circuit condition, the motor voltage and current increase very steeply. The voltage error becomes negative (feedback voltage>reference voltage of the internal loop) and, at the same time, the current measured on the motor reaches a high value. If the absolute value of the error is higher than a pre-set threshold value, the corresponding failure algorithm identifies the actual presence of the fail condition and forces the control into the fail-safe state of operation.

It should be noticed that the time taken to identify the short-circuit condition of the power switch is closely related with the electric time constant, as opposite to the prior art solutions which are linked to the mechanical time constant.

There is actually a difference of two orders of magnitude between such two time constants, obviously to the advantage of the electric time constant.

This algorithm (including the transient time) takes approximately a hundred milliseconds to command the switching off switch to open and start from the beginning of the protection procedure, as compared to approximately a second needed by the prior art solutions.

The speed acceleration that can take place during such a short period of time is by no means sufficient to cause the user to be set in any hazardous situation.

The second method used to identify the short-circuit condition of the power switch 10 is carried out by a hardware circuit that delivers a high logic level when the power switch is switching over. The level decreases rapidly down to zero whenever the switch stops switching over.

This method, which cannot obviously be used in the stand-by state (in which the first method is actually used), is enabled as an OR function with the first method in the "normal" operation state, and is particularly effective at the high speeds.

Approximately 60 milliseconds are required to command the switching-off switch to open from the moment in which a short-circuit condition occurs in the power switch. At very high speeds, when the voltage at the motor is close to the maximum output voltage of the control circuits 3, there can be no margin left to exceed the threshold activating the first method to force the control into the fail-safe operation mode. In such a case, the second method still proves effective.

It should be noticed that a condition enabling the first method to identify a short-circuit occurring in the power switch is that the motor current rises above a minimum threshold value. This prevents the algorithm from being falsely activated each time that a user causes the belt to move in the "generator model" by running in the opposite direction. In such a situation, the current measured on the motor is zero and, in a correct manner, the protection does not intervene.

Before going on with the description of the algorithm during the "normal" operation, the methods used to detect a short-circuit condition of the power switch are shortly summarized below:

identification of the short-circuit condition during initialization and the stand-by state with the switching-off switch open (dedicated voltage divider, dedicated microcontroller input);

identification of the short-circuit condition during the stand-by state (first method: "negative voltage error"); and identification of the short-circuit condition during normal operation (two methods: "negative voltage error" and detection of the "switching" action).

The fact that both methods are enabled as an OR function during the "normal" operation boosts the error-free and fail-safe reliability of the system and reduces the vulnerability thereof.

The "negative voltage error" method causes the system to switch over to the fail-safe state even in the case of a failure condition occurring in or involving the voltage divider so as to possibly annul the voltage feedback signal and cause the duty cycle of the power switch to undergo an enormous increase.

If during normal operation the motor current decreases below the minimum current threshold (such a threshold taking the system's "no-load" frictions into due account), the control will detect a false contact situation at the motor terminals and enables the fail-safe protection feature by forcing the system into the fail-safe operational state.

A further fail-safe protection feature relates to the reference voltage input.

Figure 5:
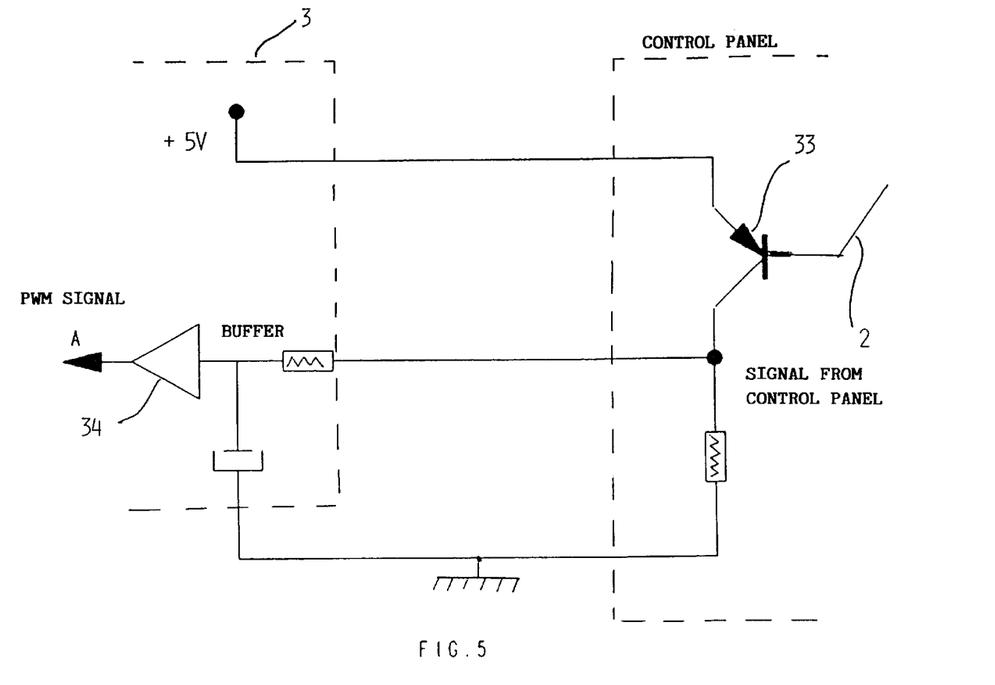
FIGS. 5 and 6 are views of two particular circuit solutions used in the control and command circuits of an apparatus according to the present invention.

No particular limit can be imposed to the dynamics of the input. With reference to FIG. 5, which illustrates an example of an interface between the command device 2 and the control circuits 3, it can be noticed that the speed reference signal 31 coming from the command device 2 is processed through the transistor 33 and through the buffer 34 (impedance decoupler) and is sent as a PWM signal to the control circuits 3 (arrow A).

There are basically two types of failures that may occur in connection with the reference signal 31:

a breakdown of the input ground lead in the case of a three-wire input; and a short-circuit condition in the modulation transistor in the case of a PWM input.

Both above cited cases lead to a situation in which the input is permanently a high one, while a maximum speed demand persists indefinitely. This could obviously cause the user to suffer an accident and the microcontroller is therefore provided with an algorithm adapted to detect possible abnormal input levels.

In the case of continuous-level inputs (which is the case of the potentiometer), the identification of an abnormally high level is based on the comparison of the input level with a pre-set threshold. Such a threshold is calculated in such a manner as to take the normal maximum input level and the related tolerances into due account.

In the case of PWM-type inputs, the identification algorithm starts by detecting the disappearance of the ramps or edges of the input signal (absence of PWM modulation). Starting from this moment, the microcontroller therefore measures the voltage level of the PWM-filtered signal A (see FIG. 5) and enables the protection mode (state 6) when the filtered voltage drops below a given threshold.

Even the protection against abnormal inputs requires just a few dozens of milliseconds to become effective.

Should the reference speed input decrease below the minimum speed threshold, the microcontroller switches back to the stand-by state and, as a result, the switching-off switch opens.

Therefore, when the voltage is applied, but the speed command is at zero, not only is the PWM output disabled by the control circuits 3, but, in addition thereto, only a negligible power is made available to the motor (since the closure relay is open).

In the normal operation state, a current limiting routine is enabled. The motor current is measured by means of a shunt 15 (FIG. 3), as amplified and converted into digital form by means of an analog-to-digital converter 16. Two different filters are applied to the measured current value, these filters being characterized by two different time constants.

When the load current exceeds the pre-established threshold, the microcontroller activates the current protection routine.

5) The load current is in any case limited to a peak of a pre-established value.

A filter with a short time constant is used to enter the current protection routine, as well as to limit the value of the peak current, while a filter with a long time constant is used to exit said current protection routine.

If the conditions required to exit the current protection mode fail to occur within a pre-determined period of time, the microcontroller switches over to the stand-by state. Otherwise, the microcontroller resets to normal operation.

6) When the control switches over to the fail-safe operation state, the PWM output is disabled, the switching-off switch 5 is opened (i.e. turned off) and the control stays in such a "latched" state until the voltage is disconnected.

No other method, but such a disconnection of the voltage and its reconnection, is possible in view of attempting to cause the walking/running surface to move again.

The coil of the relay is driven in such a manner that the coil can be energized only in the case that the microcontroller is working correctly.

Figure 6:
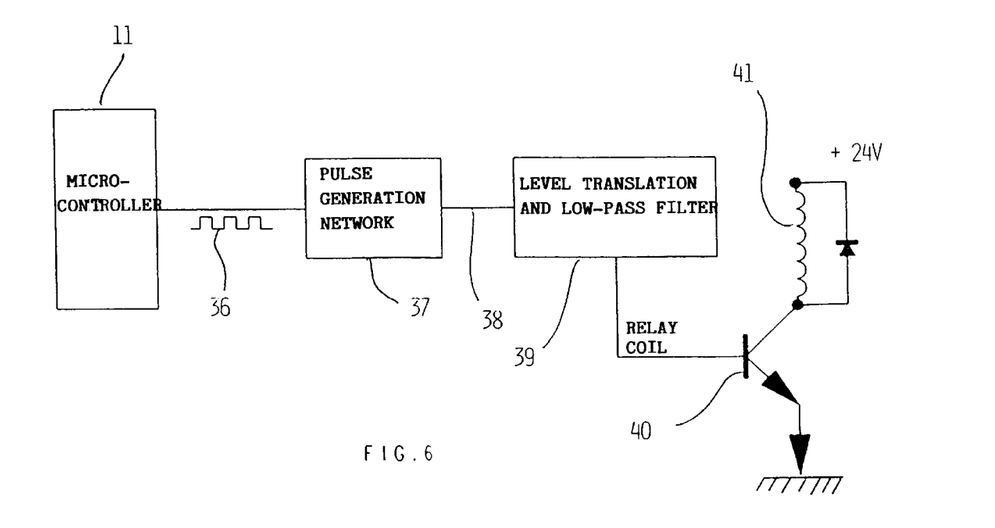

With reference to FIG. 6, which illustrates a part of the control circuits 3 dedicated to the detection of an irregular or faulty condition in the operation of the microcontroller 11, the latter can be noticed to generate a rectangular-wave train. A transition from the high level to the low level can only occur if a set of internal software-related events is correctly reset.

This practically means that the concerned parts of the program have been duly carried out and completed. Such a set of events is reset each time that the main program is started.

The rectangular waveform 36 is the input to a pulse generating network 37 (which is substantially a high-pass filter). The output pulses 38 charge a capacitor of a R-C low-pass filter 39 to apply the voltage to the base of the transistor 40 energizing the coil 41 of the switching-off switch 5.

In the case of a failure of the microcontroller, the output waveform becomes a constant-level voltage, the pulse generating network does not transfer its pulses to the low-pass filter, and the coil driving transistor switches over to its OFF state.

It should be noticed that this circuit of the "watchdog" type is independent from the microcontroller, so as to increase the system's reliability.

The control circuits 3 comprise a microcontroller unit, an input conditioning circuit, and a power circuit.

Figure 7:
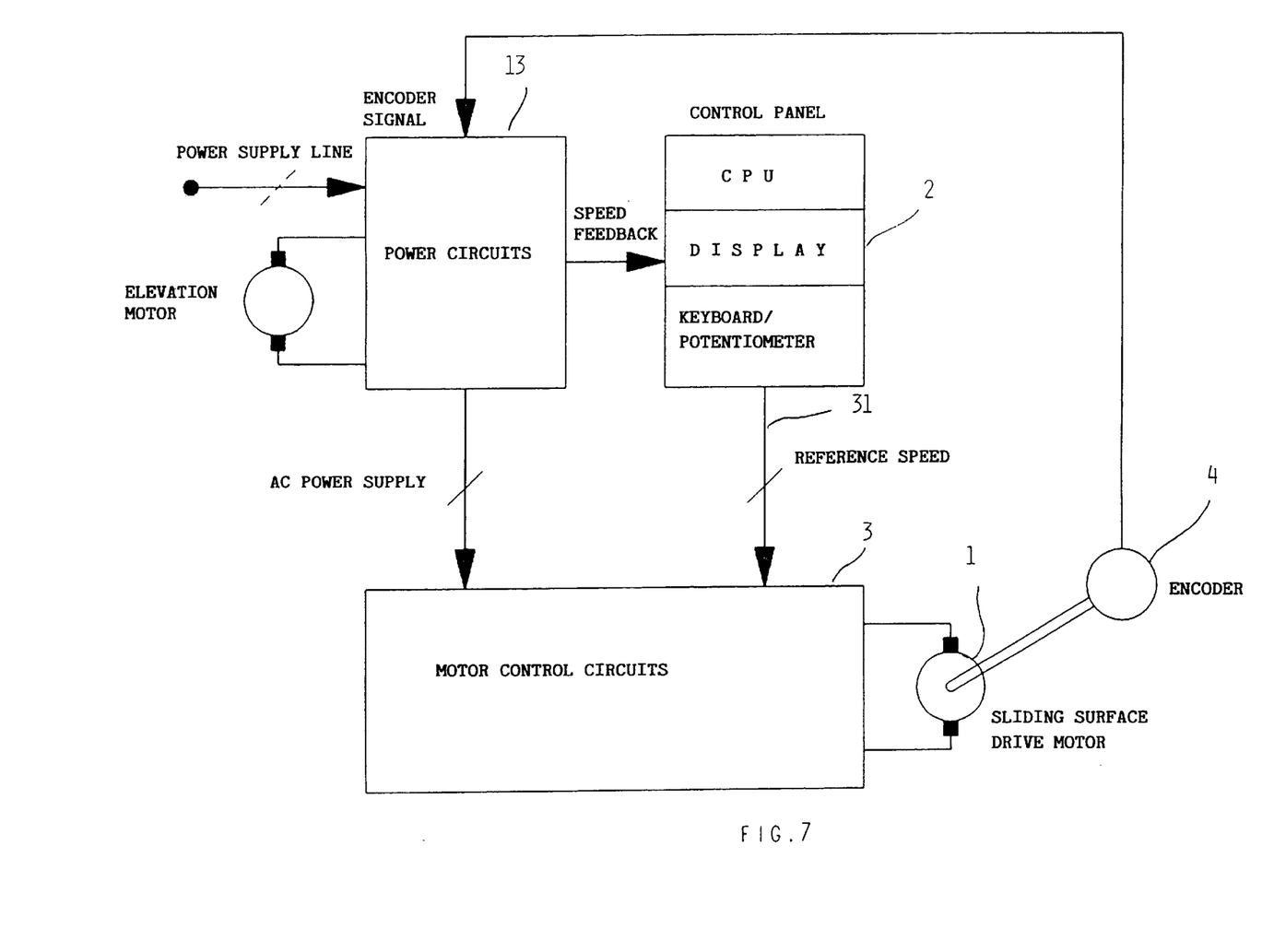
FIG. 7 is a view of an improved variant of the principle block diagram shown in FIG. 1.

FIG. 7 illustrates an advantageous variant of the embodiment illustrated in the preceding Figures. In this Figure the block diagram shown in FIG. 1 is illustrated with the addition of a speed sensor 4 (encoder) in the motor.

The CPU uses the speed information sent by the encoder 4 to close an additional speed control loop.

According to this variant, the power assembly 13 decouples the signal coming from the encoder 4 connected to the motor 1 driving the moving belt, and transmits the isolated signal to the command devices or control panel 2.

From an electric point of view, the speed reference signal can be a continuous signal (with a variable level) or a pulse-width modulated (PWM) pulse signal. In this case, the reference speed information is associated to the duty-cycle.

The proposed control system uses error detection means which differ from the ones that are generally used in prior art solutions. According to the present invention, the motor control is not dependent on the speed thereof and, therefore, on the presence of a respective sensor, and most error detection means are based solely on the motor current.

What is claimed is:

1. Apparatus comprising a moving walking/running surface, a DC motor (1) adapted to drive the movement of said surface, and control means comprising:

command means (2) adapted to generate and store the motor speed command signals;

control circuits (3) of said motor comprising a microcontroller (11) adapted to receive the motor speed command signals from said command means (2) and to drive the motor through a modulating switch (10) adapted to modulate the power being supplied;

a switching-off switch (5) adapted to bring about a rapid interruption in the power supply to the motor (1), characterized in that said control circuits (3) also comprise:

a relay control device adapted to transfer appropriate signals from said microcontroller (11) and to actuate said switching-off switch (5) on and off;

a current measurement channel arrangement (27) adapted to measure the current flowing through said DC motor (1) and to send corresponding signals to said microcontroller (11);

voltage divider/fall-safe circuits (7) adapted to:

A) detect the voltage across said modulating switch (10),

B) process this information and send the result of such a processing to said microcontroller (11); and a resistor (R) permanently connected to the terminals of said switching-off switch (5).

2. Apparatus according to claim 1, characterized in that it is adapted to operate immediately upon said switching-off switch being closed, according to following logic:

if the voltage across said modulating switch (10), as detected by said voltage divider/fail-safe circuits (7), is lower than a pre-determined value (modulating switch in a short-circuited state), said microcontroller (11) sends a corresponding command to said switching-off switch (5) through said relay control device, thereby preventing it from closing.

3. Apparatus according to claim 2, characterized in that, upon opening of said switching-off (5), said microcontroller (11) automatically freezes in the existing combination of signals/commands until it is disconnected from its power supply.

4. Apparatus according to claim 1, characterized in that, immediately upon said switching-off switch being closed, it is adapted to operate according to following logic:

if the voltage across said modulating switch (10), as detected by said voltage divider/fail-safe circuits (7), is higher than a pre-determined value, and if the reference speed signal (31) is increased to exceed a pre-determined value corresponding to the minimum speed threshold, said microcontroller (11) actuates said switching-off switch (5) into closing, while causing said modulating switch (10) to close in a controlled manner.

5. Apparatus according to claim 4, characterized in that, upon said switching-off switch (5) having been closed, if the voltage error across the motor becomes negative and, at the same time, the current is detected to exceed a pre-determined threshold value, said microcontroller (11) sends a corresponding signal that actuates said switching-off switch (5) into opening through said relay control device.

6. Apparatus according to claim 4, characterized in that, upon said switching-off switch (5) having been closed, if the voltage across said modulating switch (10) decreases to a value below a pre-determined value, and if the motor current is at the same time detected to exceed a pre-determined threshold value, said microcontroller (11) sends a corresponding signal that actuates said switching-off switch (5) into opening through said relay control device.

7. Apparatus according to claim 1, characterized in that, if during normal operation (i.e., apparatus in motion, switching-off switch closed) the current of said motor decreases below a pre-determined minimum threshold value, while the voltage at the terminals of said motor stays above a pre-determined threshold value, said microcontroller (11) sends a corresponding signal that actuates said switching-off switch (5) into opening through said relay control device.

8. Apparatus according to claim 7, characterized in that said motor current is detected and measured by said current measurement channel arrangement that transfers corresponding signals to said microcontroller (11).

9. Apparatus according to claim 1, characterized in that said microcontroller (11) is adapted:

to detect whether the speed reference signal (31) coming from said command means (2) is a continuous signal and whether it exceeds a pre-determined threshold value, and in the affirmative, to send to said relay control device a corresponding signal adapted to cause said switching-off switch (5) to open.

10. Apparatus according to claim 1, characterized in that said microcontroller (11) is adapted:

to detect whether the speed reference signal (31) coming from said command means (2) is a PWM-modulated signal and, in the affirmative case, to check the leading edges of the pulses for possibly disappearing throughout a longer period than a pre-established period, and in the affirmative, to send to said relay control device a corresponding signal adapted to cause said switching-off switch (5) to open.

11. Apparatus according to claim 9, characterized in that, upon said switching-off switch (5) having been closed owing to a corresponding signal sent by the microcontroller (11), the latter freezes automatically in the existing combination of signals/commands until it is disconnected from its supply voltage.

12. Apparatus according to claim 10, characterized in that, upon said switching-off switch (5) having been closed owing to a corresponding signal sent by the microcontroller (11), the latter freezes automatically in the existing combination of signals/commands until it is disconnected from its supply voltage.

* * * * *